(12) United States Patent
Bishop et al.

(10) Patent No.: US 9,162,276 B2
(45) Date of Patent: Oct. 20, 2015

(54) SYSTEM AND METHOD OF MANUFACTURING A STRUCTURE

(75) Inventors: Stephen K. Bishop, Dallas, TX (US); Stephen S. Swenson, Weatherford, TX (US); Crystal L. Wilson, Haslet, TX (US); Paulette D. Lemond, Rowlett, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 430 days.

(21) Appl. No.: 13/596,257

(22) Filed: Aug. 28, 2012

(65) Prior Publication Data

US 2013/0091918 A1 Apr. 18, 2013

Related U.S. Application Data

(60) Provisional application No. 61/547,136, filed on Oct. 14, 2011.

(51) Int. Cl.
*B21D 43/28* (2006.01)
*B21D 53/78* (2006.01)
(Continued)

(52) U.S. Cl.
CPC ............... *B21D 53/78* (2013.01); *B21D 35/002* (2013.01); *B21H 7/16* (2013.01); *B23P 15/02* (2013.01); *B23P 15/04* (2013.01); *B21D 11/08* (2013.01); *B64C 11/205* (2013.01); *B64C 27/473* (2013.01)

(58) Field of Classification Search
CPC .... B21D 35/00; B21D 35/001; B21D 35/002; B21D 35/006; B21D 5/02; B21D 5/04; B21D 5/002; B21D 5/004; B21D 11/02; B21D 11/08; B21D 11/085; B21D 25/04; B21D 53/78; B21H 7/16; B23P 15/02; B23P 15/04; B64C 27/473; B64C 11/205; B64C 2215/04; B64C 2215/045; B23C 2215/04; B23C 2215/045
USPC ................ 72/166, 302, 310, 324, 319, 379.2, 72/389.1, 389.2, 389.3, 340, 341; 29/889.72, 889.721, 889.6, 889.21; 416/224
See application file for complete search history.

(56) References Cited

U.S. PATENT DOCUMENTS 2,463,101 A * 3/1949 Gruetjen ...................... 29/889.6
3,262,301 A * 7/1966 Langworthy ........... B21D 11/02
65/107

(Continued)

FOREIGN PATENT DOCUMENTS

EP 1092485 A2 4/2001
WO 2010084941 A1 7/2010

(Continued)

OTHER PUBLICATIONS

Canadian Office Action in related Canadian Application No. 2,791,002, dated Nov. 25, 2014, 4 pages.

(Continued)

*Primary Examiner* — Peter DungBa Vo
*Assistant Examiner* — Joshua D Anderson
(74) *Attorney, Agent, or Firm* — Noah A. Tevis (57) ABSTRACT

The system and method of the present application can include machining complex part features in a flat metal sheet, and subsequently forming the machined flat metal sheet to have the desired shape and contours. Prior to the step of machining the complex part features, the method can include calculating a scaled location of the complex part features so that the subsequent forming step acts to translate and deform the complex part features into a desired location.

10 Claims, 5 Drawing Sheets

(51) Int. Cl.
    *B21D 35/00*    (2006.01)
    *B21H 7/16*    (2006.01)
    *B23P 15/02*    (2006.01)
    *B23P 15/04*    (2006.01)
    *B21D 11/08*    (2006.01)
    *B64C 11/20*    (2006.01)
    *B64C 27/473*    (2006.01)

(56) References Cited

U.S. PATENT DOCUMENTS

| | | | |
|---|---|---|---|
| 4,561,281 A | | 12/1985 | Tran et al. |
| 4,922,742 A | * | 5/1990 | Syrylo et al. .................... 72/308 |
| 5,694,683 A | * | 12/1997 | Teets et al. ............... 29/889.721 |
| 7,582,174 B2 | * | 9/2009 | Vigneau ........................ 148/565 |
| 7,650,773 B2 | * | 1/2010 | Shikano et al. ................. 72/382 |
| 2002/0095967 A1 | * | 7/2002 | Juhl ....................... B21D 25/02 |
| | | | 72/57 |
| 2007/0277463 A1 | * | 12/2007 | Heirich ................... B21D 5/08 |
| | | | 52/309.16 |
| 2010/0119372 A1 | | 5/2010 | Gage et al. |
| 2011/0274555 A1 | * | 11/2011 | Iwasaki ..................... 416/241 R |

FOREIGN PATENT DOCUMENTS

| | | |
|---|---|---|
| WO | 2010084942 A1 | 7/2010 |
| WO | WO 2010084942 A1 * | 7/2010 |

OTHER PUBLICATIONS

European Search Report in related European Application No. 12185032.5, dated Mar. 7, 2013, 6 pages.
Canadian Office Action in related Canadian Application No. 2,791,002, dated Jan. 20, 2014, 3 pages.
Canadian Office Action in related Canadian Application No. 2,791,002, dated Jul. 24, 2015, 6 pages.

* cited by examiner

SYSTEM AND METHOD OF MANUFACTURING A STRUCTURE

BACKGROUND

1. Technical Field

The present application relates to a system and method of manufacturing a structure. The system and method of the present application is particularly useful for manufacturing an aerodynamic structure for a rotor blade of an aircraft.

2. Description of Related Art

In general, certain aircraft structures may require a high level of precision, as well as a plurality of complex manufacturing steps configured to achieve the requisite high level of precision. For example, it is well known that chemical milling is a manufacturing process commonly used to manufacture parts having complex contours and tapered surfaces. However, chemically milling has shortcomings, such as surfaces pitting, tolerance variation, labor intensive masking, material limitations, and toxic material risks, to name a few.

Hence, there is a need for an improved manufacturing system and method that improves structure quality and accuracy, while also decreasing labor hours and part rework.

DESCRIPTION OF THE DRAWINGS

The novel features believed characteristic of the system and method of the present application are set forth in the appended claims. However, the system and method themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system and method are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present application includes a system and method for efficiently manufacturing structures having a complex surfaces and precision located features. For example, the system and method of the present application is particularly well suited for manufacturing a leading edge abrasion strip member of a rotor blade, the abrasion strip member having an exterior airfoil surface and an interior portion, each having precision located features. However, it should be fully appreciated that the system and method may be used to manufacture any variety of structures; for example, wing members, nose cones, tip-caps, and tail rotor blades, are examples of other structures that may be manufactured using the method and system of the present application.

Figure 1:
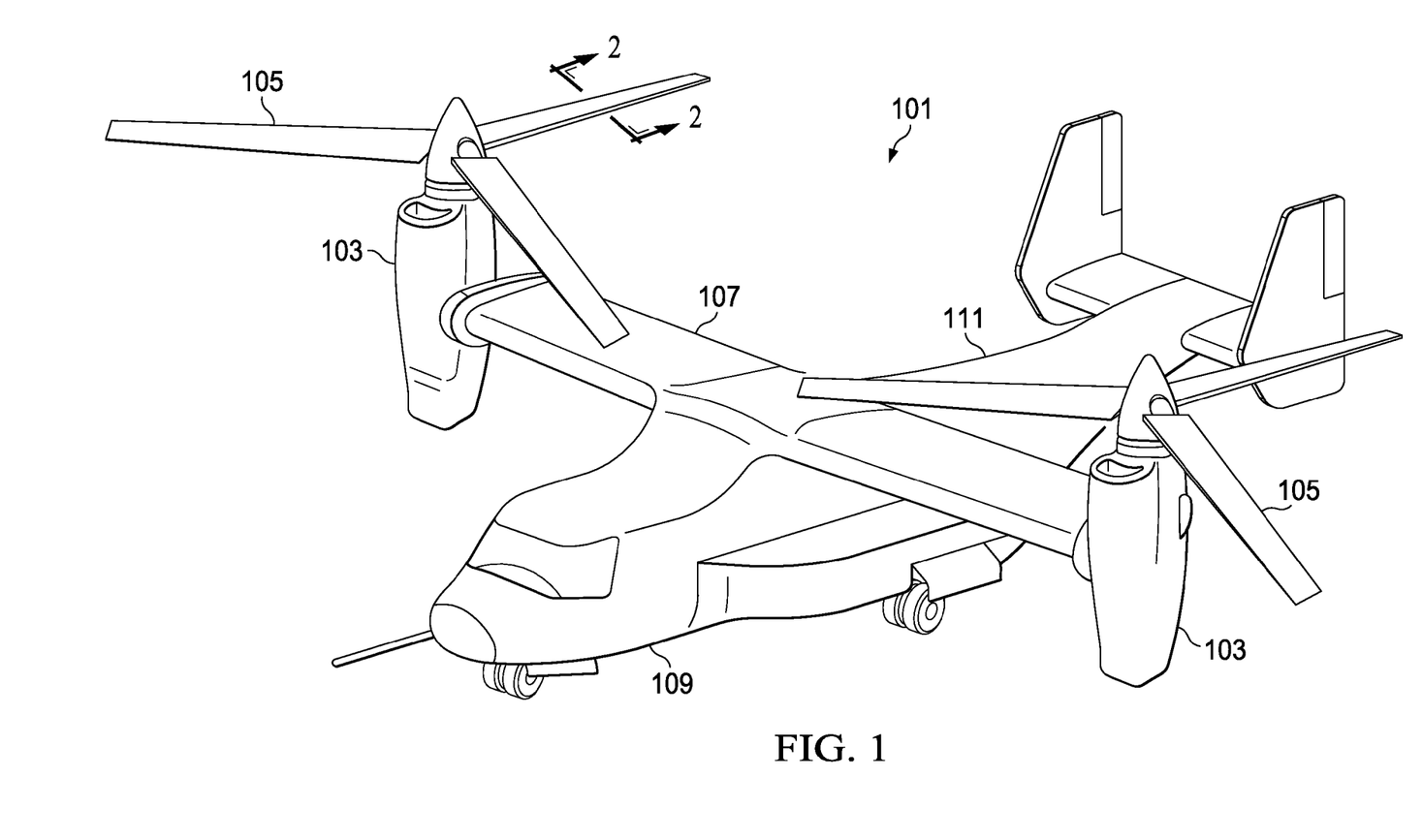
FIG. 1 is a perspective view of an aircraft, according to an illustrative embodiment of the present application.

Referring to FIG. 1, an aircraft 101 is illustrated. Aircraft 101 is a tilt-rotor aircraft having a nacelle 103 on each of end of a wing 107. Each nacelle 103 includes a rotor hub with a plurality of rotor blades 105. Aircraft 101 further includes a fuselage 109 and a tail member 111. Aircraft 101 is illustrated as a tilt-rotor aircraft for exemplary purposes only. It should be appreciated that the method and system of the present application may be used to manufacture structures on aircraft other than a tilt-rotor aircraft. Further, the method and system of the present application may be used to manufacture structures on non-aircraft vehicles and implementations.

Figure 2:
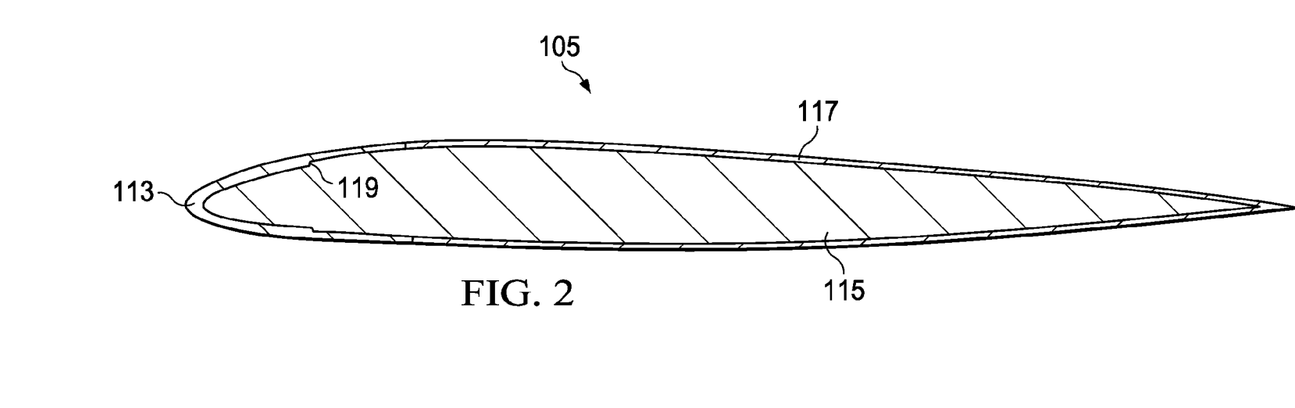
FIG. 2 is a cross-sectional view of a rotor blade, taken at section lines 2-2 in FIG. 1, according to the illustrative embodiment of the present application.

Referring now also to FIG. 2, each rotor blade 105 includes an abrasion strip member 113 located on a leading edge portion of rotor blade 105. Rotor blade 105 further includes a body portion 115 and a skin member 117. As known in the art, body portion 115 can include any variety of structures, such as a spar, a composite core, a rib, to name a few. In the exemplary embodiment, abrasion strip member 113 includes dimensions that are critical to the structural integrity and performance of rotor blade 105. For example, the exterior airfoil shape and contour of abrasion strip member 113 is critical to the performance of rotor blade 105. Further, the inner shape and dimensions of abrasion strip member 113 can be critical for mating with body portion 115. For example, a location of a lip portion 119 can be critical for the proper structural mating with a spar in body portion 115.

Figure 3:
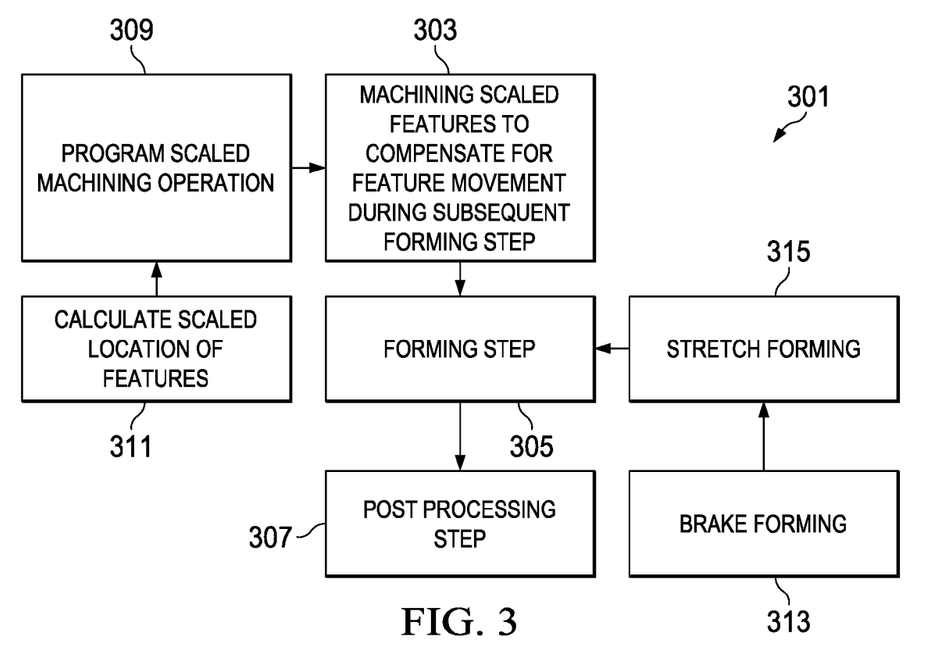
FIG. 3 is a schematic view of a method of manufacturing, according to the illustrative embodiment of the present application.

Referring now to FIG. 3, a method 301 of manufacturing a structure is schematically illustrated. For example purposes, method 301 is illustrated with regard to manufacturing abrasion strip member 105. Method 301 includes a step 303 which involves machining scaled features with a size and location that compensates for feature movement during a subsequent forming step. Method 301 further includes a forming step 305 and a post processing step 307.

Step 303 includes a step 311 for calculating the scaled location of the machined features. In step 305, the part is formed through in a stretch forming and/or brake forming procedure that deforms and moves features of the part. As such, step 311 involves calculating the scaled size and location of the features so that the features will be in the proper location subsequent to forming step 305. In the preferred embodiment, step 311 is performed by first machining the features in the part, then brake forming and stretch forming the part, then measuring the dimension dislocation and distortion of the machined features. Data pertaining to the measured dimension dislocation and distortion of the machined features can be statistically evaluated to confirm relative uniformity of feature movement within context of allowable tolerances for both measurement capability and final part assembly. In an alternative embodiment, the calculation of the scaled size and location of the machined features is performed analytically, such that the scaled size and location of the machined features is determined by analytically predicting the dislocation and distortion of the machined features in the forming step 305.

Step 309 includes programming the machining tool with the data developed in step 311. It is well known in the art that machining tools, such as a CNC machining tool, are typically programmable with a set of instructions for machining the part. As such, step 309 includes programming the machining tool to machine the desired part features in accordance with the scaled feature size and location determined in step 311.

Figure 4:
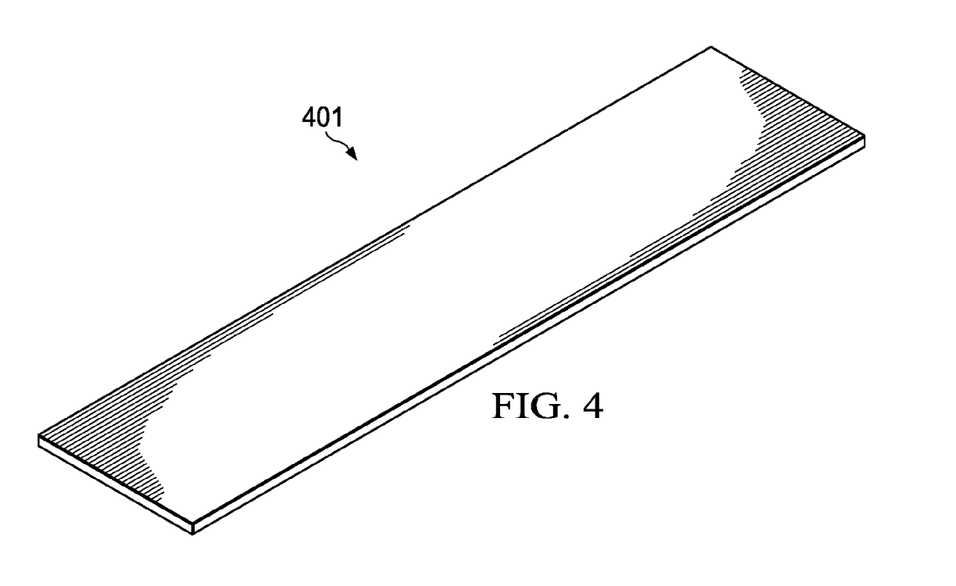
FIG. 4 is a perspective view of a metal sheet, according to an illustrative embodiment of the present application.
Figure 5:
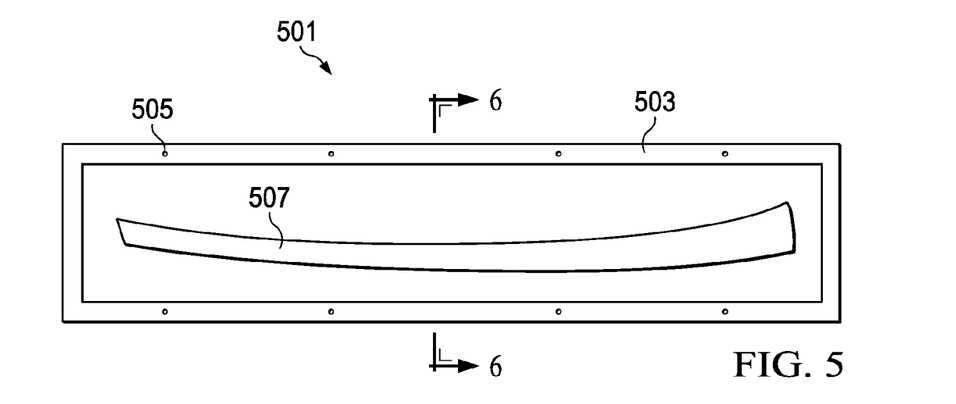
FIG. 5 is a top view of a machined metal sheet, according to an illustrative embodiment of the present application.
Figure 6:
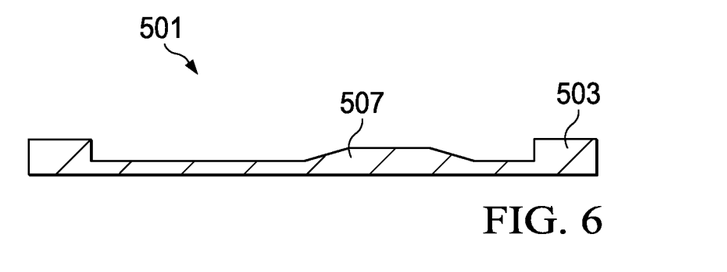
FIG. 6 is a cross-sectional view of the machined metal sheet, taken at section lines 5-5 in FIG. 5, according to the illustrative embodiment of the present application.

Referring now also to FIGS. 4-6, the machining of abrasion strip member 113 is illustrated as an example of a machining operation in step 303. At least some of the machined features in step 303 are located and sized so that a subsequent forming step functions to move and distort the features into the desired final location. As such, at least some of the features as machined in step 303 are not of the final size and location until after a subsequent forming operation in step 305. In the illustrated embodiment, step 303 includes machining the scaled features onto a flat blank sheet 401. Blank sheet 401 is illustrated in FIG. 4. The size and material of sheet 401 is implementation specific. In one embodiment, sheet 401 is stainless steel (301SS) and approximately 0.075 inches thick, 6 feet long, and 14 inches wide. However, it should be fully appreciated that other materials and sizes of sheet 401 may be used.

Referring to FIGS. 5 and 6, example machined article 501 is illustrated. The scaled sizes and locations of the features are machined into machined article 501 while sheet 401 is in the flat state. In the illustrated embodiment, a frame 503 having a uniform thickness is preserved in sheet 401. Further, tooling holes 505 can be located in the frame 503. Frame 503 and tooling holes 505 are configured to facilitate brake forming and stretch forming in the forming step 305, as discussed further herein. One example feature that is machined in a scaled location is a profile feature 507. Feature 507 includes a periphery and thickness profile that is machined in a scaled location and thickness so that the scaled features move and distort into the desired position in the subsequent forming step 305. The periphery of feature 507 is contoured in relation to a centerline of the part because of a built-in twist of abrasion strip member 113. Alternative embodiments of abrasion strip member 113 may have zero twist, such that feature 507 is approximately centered and symmetric on a lengthwise centerline.

Referring again to FIG. 3, method 301 further includes a forming step 305. In the preferred embodiment, step 305 includes a brake forming step 313 and a subsequent stretch forming step 315. However, it should be appreciated that step 305 may include any forming procedure that achieves dimension dislocation and distortion of the machined features. Brake forming step 313 includes using a brake die, the leading edge of the brake die being properly aligned with the machined article 501 with use of tooling pins inserted into tooling holes 505. The brake forming in step 305 bends machined article 501 around a brake die so as to establish the radius of abrasion strip member 113.

Next, stretch forming step 315 is performed with precision to reproducibly distort the part. The stretch forming is performed in a controlled manner so as to control the strain-rate applied to the metal. Lubrication can be used to prevent any sudden slippage or jerking that might otherwise happen if the part were to bind with the stretch forming tool. Further, tooling pins may be located in tooling holes 505 to assure positive location of the part during stretch forming. Preferably, the jaws of the stretch forming tool are attached to the previously braked formed machine article 501 at the frame 503 that is intentionally produced in the machining step 303. Preferably, frame 503 has a constant thickness and sufficient width to provide grip on the entire jaw-plate of the stretch form grips (jaws). Strain rate is controlled and consistent during the stretch forming so as to prevent the part from distorting in an undesired manner. Further, the over-press part of the stretch forming tool should also be controlled to form the part.

Figure 7:
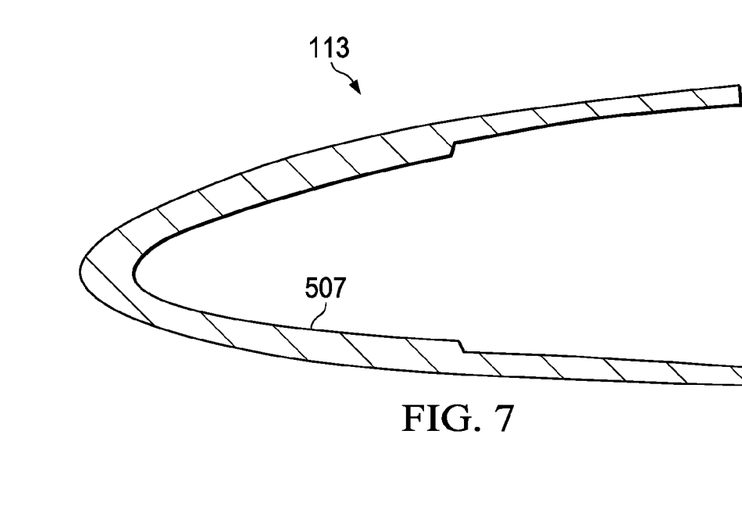
FIG. 7 is a cross-sectional view of a finished abrasion strip member, according to an illustrative embodiment of the present application.

Method 301 can further include a post processing step 307 for upgrading and trimming the part. For example, step 307 can include trimming off frame 503 and touching up any surface finish blemishes. Step 307 can also include a dye-penetrant check to confirm the absence of cracks and pits in the part. Referring now also to FIG. 7, abrasion strip member 113 is illustrated after frame 503 is trimmed off.

Figure 8:
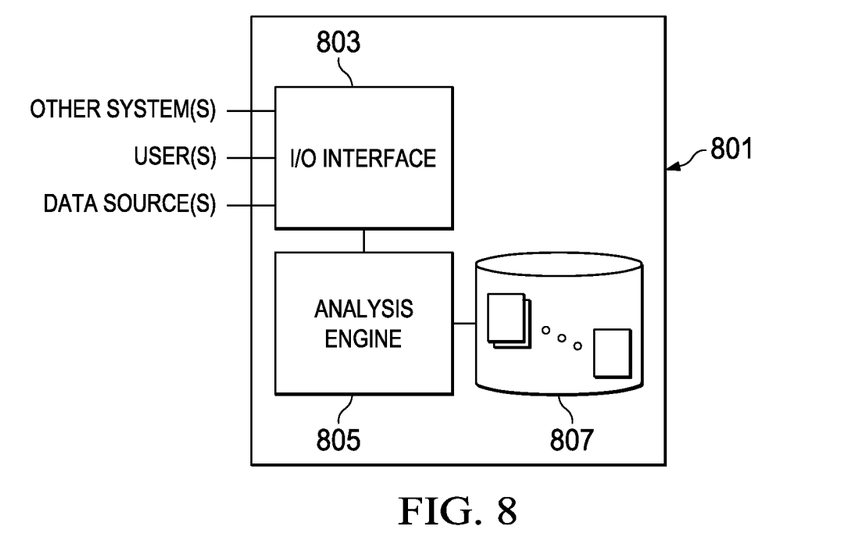
FIG. 8 is a schematic block diagram of a system, according to an illustrative embodiment of the present application.

Referring now to FIG. 8, a computer system 801 is schematically illustrated. System 801 is configured for performing one or more functions with regard to method 301, as well as other methods or processes described herein.

The system 801 can include an input/output (I/O) interface 803, an analysis engine 805, and a database 807. Alternative embodiments can combine or distribute the input/output (I/O) interface 803, analysis engine 805, and database 807, as desired. Embodiments of the system 801 can include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 803 provides a communication link between external users, systems, and data sources and components of the system 801. The I/O interface 803 can be configured for allowing one or more users to input information to the system 801 via any known input device. Examples can include a keyboard, mouse, touch screen, and/or any other desired input device. The I/O interface 803 can be configured for allowing one or more users to receive information output from the system 801 via any known output device. Examples can include a display monitor, a printer, and/or any other desired output device. The I/O interface 803 can be configured for allowing other systems to communicate with the system 801. For example, the I/O interface 803 can allow one or more remote computer(s) to access information, input information, and/or remotely instruct the system 801 to perform one or more of the tasks described herein. The I/O interface 803 can be configured for allowing communication with one or more remote data sources. For example, the I/O interface 803 can allow one or more remote data source(s) to access information, input information, and/or remotely instruct the system 801 to perform one or more of the tasks described herein.

The database 807 provides persistent data storage for system 801. While the term "database" is primarily used, a memory or other suitable data storage arrangement may provide the functionality of the database 807. In alternative embodiments, the database 807 can be integral to or separate from the system 801 and can operate on one or more computers. The database 807 preferably provides non-volatile data storage for any information suitable to support the operation of the system 801, including various types of data discussed further herein.

The analysis engine 805 can be configured for calculating and predicting the scaled location of machined features in step 311, programming the scaled machining operation in step 309, as well as other concepts disclosed herein. For example, the analysis engine 805 can be configured to analytically predict the dimension dislocation and distortion of the machined features during the forming procedures, thereby analytically calculating the scaled location of the features for machining. The analysis engine 805 can include various combinations of one or more processors, memories, and software components.

The system and method of the present application provide significant advantages, including: 1) creating the critical and complex surface features prior to brake forming and stretch forming; 2) calculating the scaled location of the machined features so that a subsequent forming step translates and deforms the machined features into the desired location; and 3) providing a manufacturing method which does not require the chemical milling.

Another advantageous feature of the system and method is the placement of tooling holes 505 in the same machining operation in step 303 for machining the scaled features, so as to reduce tolerance stack-up as compared to separately drilling tooling holes 505 in a separate step. Tooling holes 505 are configured for use with tooling pins in the brake form die so as to maintain alignment of the features about a leading edge reference datum.

Another advantageous feature of the system and method is integrating frame 303 into machined article 501 so that tooling used for forming can utilize the uniform thickness of frame 303 to prevent part slippage and non-uniform stress concentration in the machine article 501 during a forming step, such as stretch forming step 315.

It is apparent that a system and method having significant advantages has been described and illustrated. Although the system and method of the present application are shown in a limited number of forms, they are not limited to just these forms, but are amenable to various changes and modifications without departing from the spirit thereof.

The particular embodiments disclosed above are illustrative only, as the system and method may be modified and practiced in different but equivalent manners apparent to those skilled in the art having the benefit of the teachings herein. Modifications, additions, or omissions may be made to the system and method described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A method of manufacturing an article, the method comprising:
    machining a single metal sheet to remove metal material from the metal sheet, the metal sheet originally being a flat sheet having a first surface and second surface with a thickness therebetween, the machining of the metal creates a scaled feature and a frame portion, the scaled feature being a thickness step change on the first surface, the scaled feature including a periphery and a thickness profile with a greater thickness than a relatively thin section surrounding the scaled feature, the frame portion being approximately uniform thickness around an edge portion of the metal sheet and surrounding the relatively thin section and the scaled feature;
    creating a plurality of tooling holes in the frame portion;
    brake forming the metal sheet, subsequent to the step of machining the metal sheet, so as to fold the metal sheet around a brake die to establish an outer radial portion on the second surface of the metal sheet; and
    stretch forming the metal sheet, subsequent to the step of brake forming the metal sheet, so as to distort the scaled feature by stretching the metal sheet by pulling the frame portion away from the outer radial portion.

2. The method according to claim 1, further comprising:
    calculating a scaled location of the scaled feature prior to the step of machining the metal sheet.

3. The method according to claim 2, wherein the step of calculating the scaled location of the scaled feature includes analytically predicting a movement of the scaled feature that occurs during the step of stretch forming the metal sheet.

4. The method according to claim 2, wherein the step of calculating the scaled location of the scaled feature includes machining a test feature in a test specimen, then forming the test specimen, then measuring a distortion of the test feature.

5. The method according to claim 2, wherein the step of calculating the scaled location of the scaled feature includes machining a plurality of test features in a test specimen, subsequently forming the test specimen, and then measuring a distortion of each test feature.

6. The method according to claim 2, further comprising:
    programming the scaled location of the scaled feature into a machining tool.

7. A method of manufacturing an abrasion strip member for a rotor blade, the method comprising:
    machining a scaled feature into a single metal sheet to remove metal material from the metal sheet, the metal sheet originally being a flat sheet having a first surface and second surface with a thickness therebetween, the machining of the metal creates a scaled feature and a frame portion, the scaled feature being a thickness step change on the first surface, the scaled feature including a periphery and a thickness profile with a greater thickness than a relatively thin section surrounding the scaled feature, the frame portion being approximately uniform thickness around an edge portion of the metal sheet and surrounding the relatively thin section and the scaled feature;

creating a plurality of tooling holes in the frame portion;

brake forming the metal sheet, subsequent to the step of machining the metal sheet, so as to fold the metal sheet around a brake die to establish an outer radial portion on the second surface of the metal sheet; and stretch forming the metal sheet, subsequent to the step of brake forming the metal sheet, so as to distort the scaled feature by stretching the metal sheet by pulling the frame portion away from the outer radial portion.

8. The method according to claim 7, wherein the scaled feature is a lip portion that is configured for mating to a body portion of the rotor blade.

9. The method according to claim 7, wherein the step of stretch forming the metal sheet produces the final contour of the abrasion strip member.

10. The method according to claim 7, further comprising:

trimming the frame portion off of the abrasion strip member.

* * * * *